(12) United States Patent
McCulley

(10) Patent No.: US 8,978,723 B2
(45) Date of Patent: Mar. 17, 2015

(54) SOLID VACUUM WHEEL AND TIRE ASSEMBLY

(76) Inventor: Michael Marion McCulley, Benicia, CA (US)

( * ) Notice: Subject to any disclaimer, the term of this patent is extended or adjusted under 35 U.S.C. 154(b) by 0 days.

(21) Appl. No.: 13/443,452

(22) Filed: Apr. 10, 2012

(65) Prior Publication Data

US 2012/0193005 A1     Aug. 2, 2012

(51) Int. Cl.
| | |
|---|---|
| *B60C 7/00* | (2006.01) |
| *B60C 29/02* | (2006.01) |
| *B60C 7/10* | (2006.01) |
| *B60B 19/04* | (2006.01) |
| *B60B 21/12* | (2006.01) |
| *B60C 29/00* | (2006.01) |
| *B60C 17/06* | (2006.01) |

(52) U.S. Cl.
CPC ................. *B60C 7/105* (2013.04); *B60B 19/04* (2013.01); *B60B 21/12* (2013.01); *B60C 29/02* (2013.01); *B60C 29/002* (2013.01); *B60C 17/065* (2013.04); *B60B 2900/212* (2013.01)
USPC .......... 152/310; 152/246; 152/381.6; 152/427

(58) Field of Classification Search
CPC .......... B60C 7/105; B60C 7/12; B60C 7/125; B60C 2001/0091; B60C 29/02
USPC .............. 29/894.31; 152/246, 310, 311, 323, 152/378, 381.6, 427, DIG. 17
See application file for complete search history.

(56) References Cited

U.S. PATENT DOCUMENTS

| | | | | | |
|---|---|---|---|---|---|
| 569,566 | A | * | 10/1896 | Pratt | 152/157 |
| 3,399,707 | A | * | 9/1968 | Williams | 152/321 |

FOREIGN PATENT DOCUMENTS

| | | | |
|---|---|---|---|
| CN | 201009684 Y | * | 1/2008 |
| DE | 29919296 U1 | * | 5/2000 |

* cited by examiner

*Primary Examiner* — Kip T Kotter

(57) ABSTRACT

A solid vacuum wheel and tire assembly incorporating a vacuum to adhere a solid tire in place against a wheel rim, allowing for safe and reliable operation. The assembly incorporates a flexible solid tire core which contracts into place after a vacuum is applied, contracting and adhering directly onto the wheel rim and filling a void between the rim and tire, having no air pressure to go flat or release if punctured. Vacuum channels installed along the wheel rim direct a vacuum seal to the tire core. A vacuum valve is installed into a vacuum chamber, which acts as a conduit to direct the vacuum throughout the assembly. The solid tire incorporates a possible concave shaped tire tread configuration, tire tread rubber and a steel belt. The solid tire core material comprising of solid or porous rubber, jell or a combination of each provides a solid flexible non-pneumatic core structure.

3 Claims, 4 Drawing Sheets

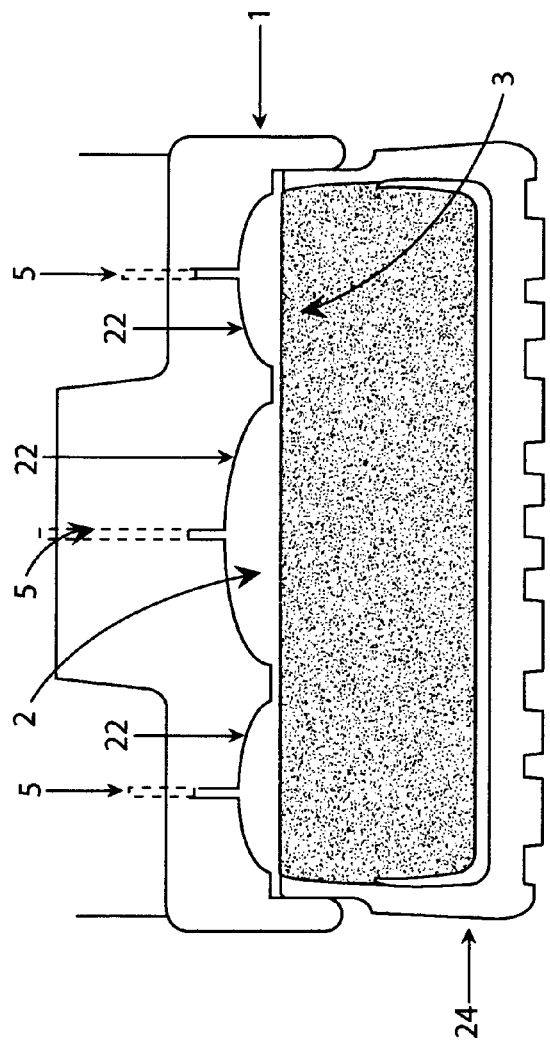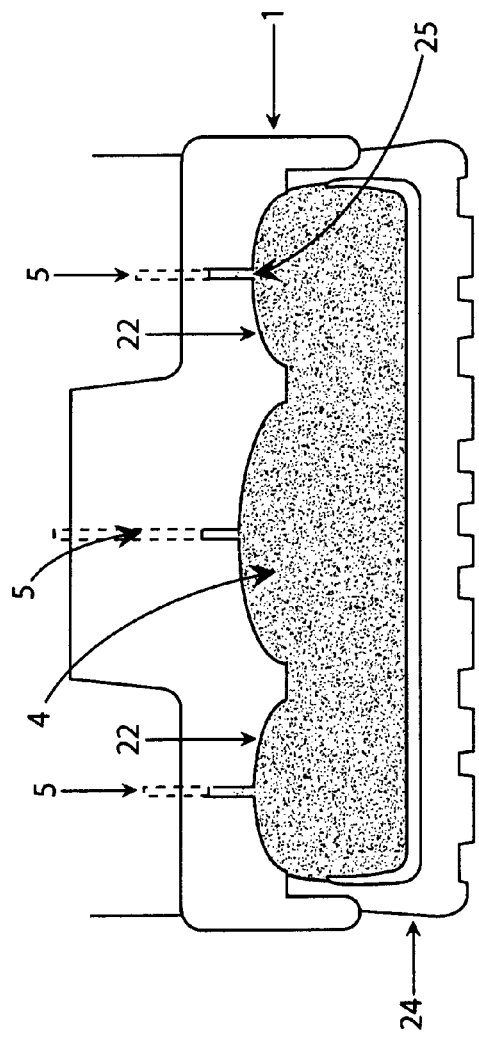
Fig. 1a
Fig. 1b

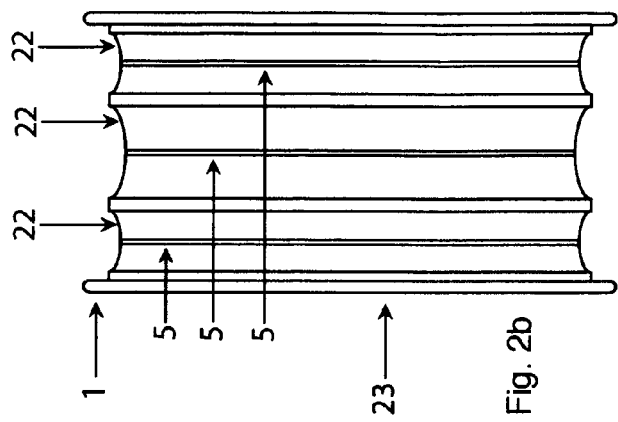
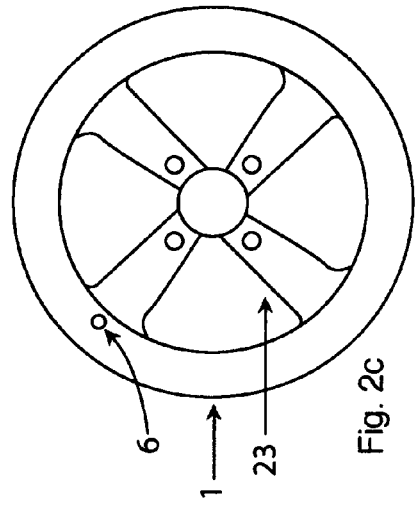
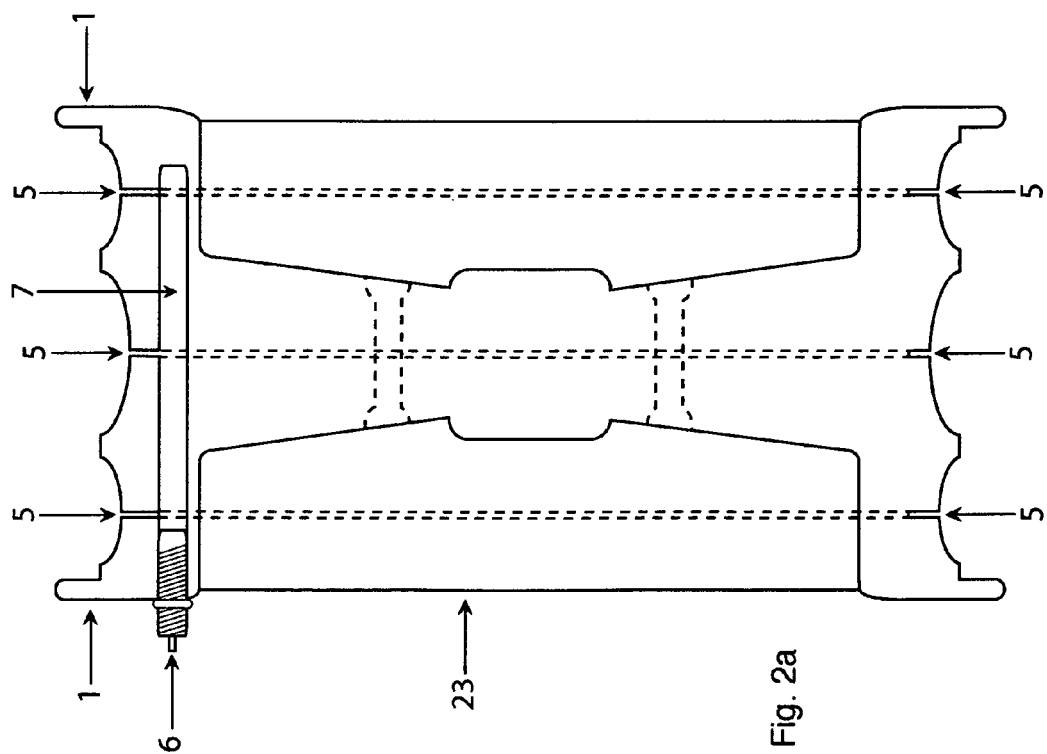

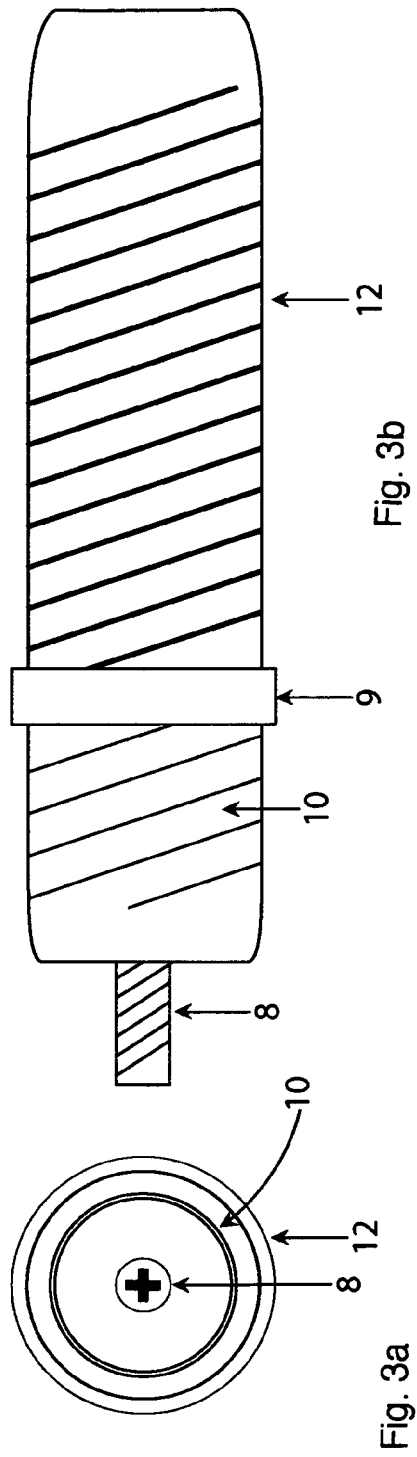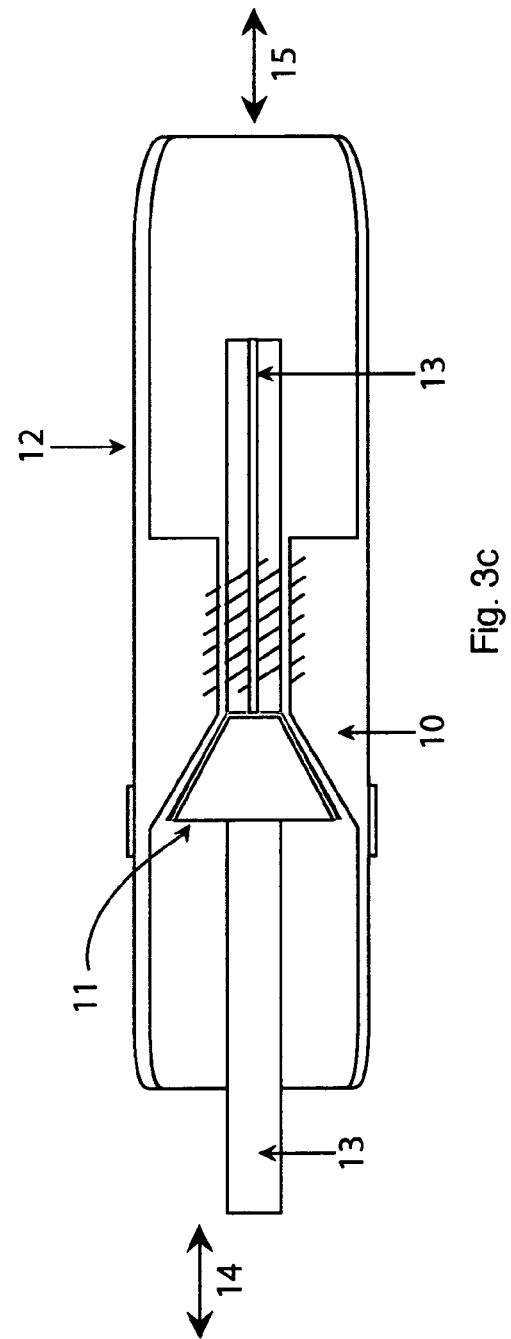

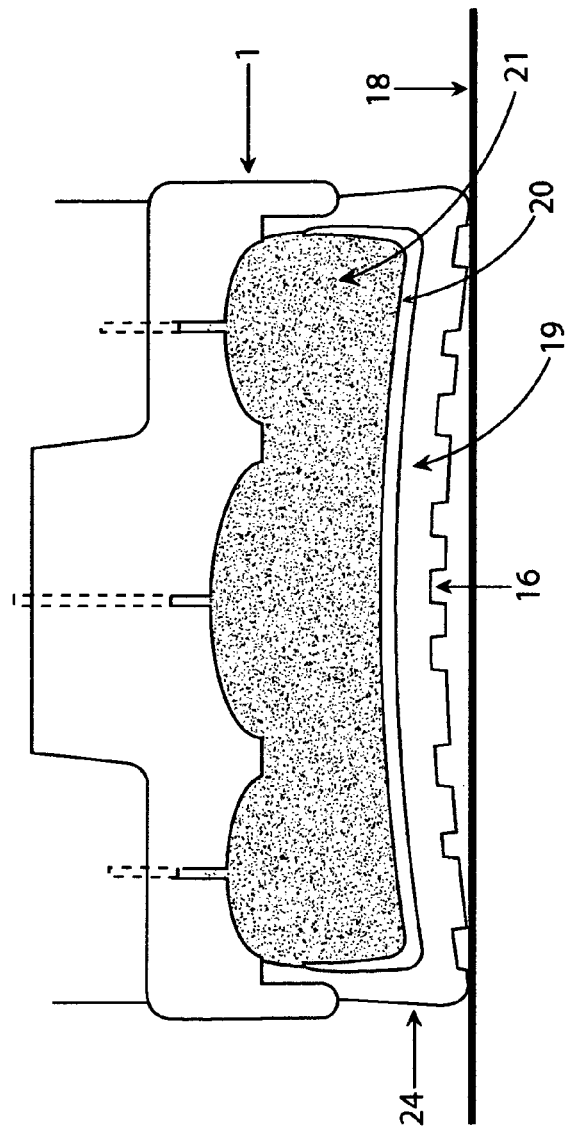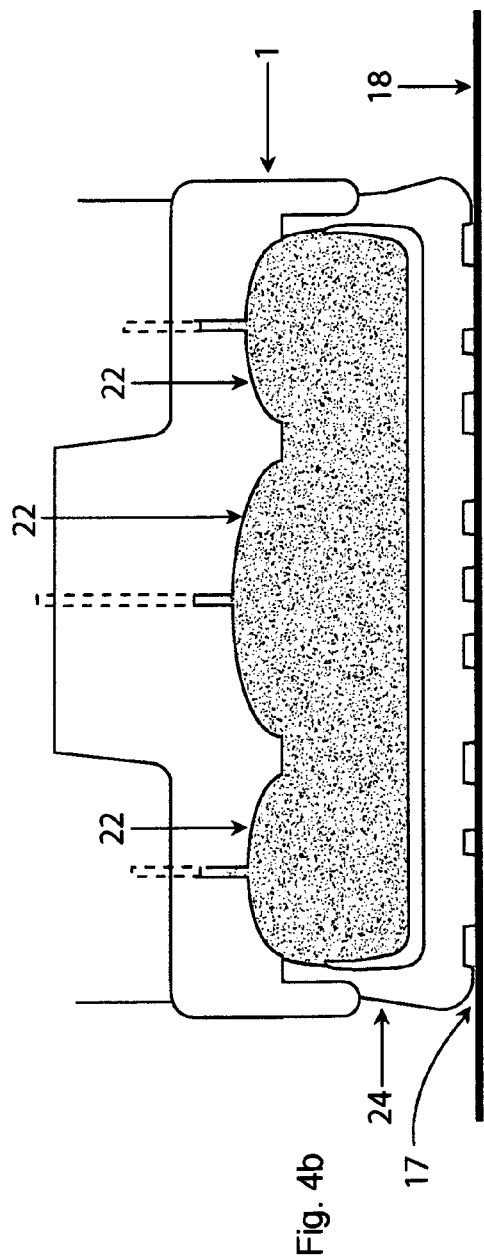
Fig. 4a
Fig. 4b

SOLID VACUUM WHEEL AND TIRE ASSEMBLY

FIELD OF THE INVENTION

The present invention relates generally to resilient tires and wheels.

BACKGROUND OF THE INVENTION

Several conventional designs already exist for pneumatic wheel and tire assemblies for road going and air transportation. These conventional systems suffer several disadvantages. One disadvantage with pneumatic wheel and tire assemblies is that they can go flat or have a catastrophic failure such as a blowout. With a flat tire, a pneumatic wheel and tire assembly will require a repair or replacement before the vehicle can become operational again. With a blowout, on the other hand, a serious crash can occur that can cause injuries and possibly death to the occupants of the vehicle. Having air pressure to check and constantly maintain can also be a disadvantage of conventional systems, and a slow leak can go undetected. Low pressure can also have a negative impact on the fuel efficiency of the vehicle. A spare tire assembly is necessary with conventional designs, due to the fact that one tire may be flat and in need of repair, and the spare tire and jack equipment can additionally be a disadvantage in the overall weight of the vehicle. Moisture inside a pneumatic wheel and tire airspace can also cause corrosion over time. Another disadvantage with pneumatic wheel and tire assemblies is that they do not keep a constant pressure due to changing ambient temperatures, and this creates flux in operating conditions.

Many conventional designs also already exist for solid wheel and tire assemblies. One disadvantage with conventional solid wheel and tire assemblies is that they often need to be attached to the wheel frame in order to stay in place. Another disadvantage is that solid wheel and tire assemblies tend to be large, ridged and heavy, and these assemblies cannot often achieve high-speed operation. Solid tires have an advantage in load that they can bear, the fact that they have no air to release and can't go flat or blow out suddenly do to overheating, wear or punctures.

SUMMARY OF THE INVENTION

The present invention incorporates a solid vacuum wheel and tire assembly that can overcome the disadvantages in conventional pneumatic tires while retaining the advantages of solid tires. The present invention is suitable for automobiles, motorcycles or aircraft. The solid vacuum wheel and tire assembly is the first of its kind to incorporate a vacuum seal to adhere the tire directly against the wheel rim, and this advantage will allow it to achieve non-pneumatic operation without the possibility that the wheel will spin inside the tire during operation. There is no possibility that the tire on the wheel assembly can go flat or have a blowout, since it is non-pneumatic, and this advantage will provide for a much safer operation. A spare tire assembly becomes unnecessary due to the present invention, and all jack equipment is also unnecessary due to the fact that there will never be a flat tire to change. The advantage of the absence of unnecessary spare tire equipment will decrease the overall weight of the vehicle as well as the space that is needed to house the spare wheel and tire equipment, which will in turn increase the performance of the vehicle as well as fuel efficiency. Another advantage will be no tire air pressure to check and constantly maintain in the present invention, and the assembly will keep a constant operating vacuum seal over all operating conditions. The rigidity of the tire remains constant, since it is solid. There will additionally be no moisture inside the tire to cause wheel corrosion over time due to the vacuum seal. The solid vacuum tire and wheel assembly can also be configured for an extremely lightweight low-profile design. There will additionally be no possibility of thermal expansion and failure, since there will be no air to expand. The solid vacuum tire does not roll off of the vacuum wheel assembly due to extreme operating conditions, since the tire is solid with no sidewalls to buckle, and the solid vacuum tire core remains firmly attached. The solid vacuum wheel and tire assembly incorporates a flexible tire core that will be able to contract into place after a vacuum is applied. With a vacuum applied to the wheel, the tire core contracts and adheres directly onto the wheel assembly rim for operation by filling a concave void between the wheel and the rim that is present before a vacuum is applied. Vacuum channels are located along the wheel assembly rim surface in order to direct an even vacuum seal between the solid flexible inner tire surface and the wheel rim. As the solid tire rotates, the vacuum will keep it adhered to the wheel rim without separating during operation.

A vacuum valve assembly is threaded into the wheel rim, installed into a vacuum chamber and held in place by a ring seal. The vacuum chamber acts as a conduit to direct a vacuum throughout the assembly. Airflow in ether direction can flow in and out of the vacuum valve body. A valve stem and a vacuum rubber stopper are threaded into the valve body during operation. The vacuum keeps the valve stem in place during operation. To release a vacuum, the valve stem tip can be unscrewed from the valve body to release the vacuum seal and empty the void between the tire and rim. With no vacuum, there is a void present between the solid tire and wheel rim in order to facilitate tire replacement.

The solid vacuum wheel and tire assembly is capable of incorporating a concave shaped tire tread configuration as well as a straight configuration parallel to the ground surface. The concave configuration is intended to increase stability in vehicle handling by creating a strong stable bond between the ground surface and the solid tire. This advantage will decrease tire roll associated with conventional tires. The concave tire sits flat on the ground surface with weight applied to the vehicle. The tire core will also increase the load that the tire can bear, since it is solid. The tire tread is comprised of resilient tire tread rubber, and a steel belt is added for tire strength. The solid tire core material is comprised of rubber that has the strength and resiliency to directly adhere the tire to the wheel rim concave surface and compress the tire to the rim during operation, as well as retaining a constant vacuum seal. The solid tire core material comprising of solid or porous rubber, jell or a combination of each. An object, such as a nail, would be able to penetrate into the tire tread, core or sidewall without the tire losing any air, such as in pneumatic tires. The solid vacuum tire and wheel assembly will provide an extremely safe, efficient and reliable tire incapable of going flat or having a catastrophic failure such as a blowout.

The solid vacuum wheel and tire assembly is comprised of a vacuum wheel assembly and a solid vacuum tire. The solid vacuum tire is comprised of a flexible center core comprising of solid or porous rubber, or jell surrounded by a steel belt and further surrounded by a resilient tire tread rubber. The solid vacuum tire is installed onto the vacuum wheel assembly. The flexible center core of the solid vacuum tire will contract and adhere directly into place onto a wheel rim while a vacuum is applied, and the flexible center core contracts and adheres directly against the wheel rim and remains in place during operation after the vacuum is applied. The solid vacuum tire contains no air pressure to go flat or release due to a puncture. Several vacuum channels are located within the wheel rim along a concave surface in order to direct an even vacuum seal. The vacuum seal is created by the vacuum contracting the flexible center core of the solid tire into a void that is present before the vacuum is applied between the flexible center core and the concave surface of the wheel rim. The vacuum channels are distributed along the concave surface of the wheel rim as needed to achieve the vacuum seal between the solid vacuum tire and the concave surface in order to adhere the solid vacuum tire in place and directly in contact with the vacuum wheel assembly during operation. This vacuum seal will prevent the solid tire from spinning inside the wheel rim.

A vacuum valve assembly is installed into a vacuum chamber, and the vacuum chamber is located inside a wheel rim. The vacuum chamber acts as a conduit to direct a vacuum throughout the solid vacuum wheel and tire assembly. The vacuum valve assembly is comprised of a valve stem, a vacuum valve body and a ring seal, and the valve stem is comprised of a valve stem tip and a vacuum rubber stopper, which are removed from the vacuum valve body in order to apply the vacuum or to release the vacuum. Air can flow into and out through the valve body. The valve stem is threaded into the vacuum valve body to stop airflow, and airflow into and out through the valve body is eliminated by the vacuum rubber stopper during operation The release of the vacuum is achieved by removing the valve stem from the vacuum valve body in order to let air through the vacuum valve assembly. The valve body and the ring seal are threaded the vacuum chamber of the wheel rim. A solid vacuum tire would be installed onto a vacuum wheel assembly before the vacuum is applied through the vacuum valve assembly. Releasing the vacuum between the vacuum wheel assembly and the solid vacuum tire through the vacuum valve assembly will be done to allow the solid vacuum tire to be removed from the vacuum wheel assembly.

The entire solid vacuum tire configuration can be concave or parallel to the ground surface with no weight applied to the solid vacuum wheel and tire assembly of a vehicle such as an automobile, motorcycle or aircraft. The resilient tire tread rubber of the solid tire rests parallel on a ground surface with weight applied to the vehicle. A steel belt is installed into the flexible center core of the solid tire for additional strength. The flexible center core can be comprised of solid rubber, porous rubber, jell, or a combination of each that has the strength and resiliency to adhere the flexible center core to the wheel rim and also compress the flexible center core to the wheel rim while retaining a constant vacuum seal. The flexible center core will adhere the solid vacuum tire in place onto a concave surface during operation while the vacuum seal is applied. The solid vacuum tire will remain continuously ridged and non-pneumatic during operation.

This solid tire advantage will achieve a consistent tire rigidity and therefore optimal fuel efficiency, since there will be no air pressure to leak out over time. The continuously ridged tire will also maintain optimal wear over time, commonly associated with properly inflated tires, since the tire is solid and therefore will not deflate. Additionally, silica can optionally replace carbon black in the tire tread rubber to prevent tire hysteresis, and the tire flexible center core material can be configured to decrease tire deformation on the ground surface, commonly associated with low-rolling resistance tires.

BRIEF DESCRIPTION OF THE FIGURES

FIG. 1a represents the solid vacuum wheel and tire assembly with a void between a flexible center core and a wheel rim before a vacuum is applied.

FIG. 1b represents the solid vacuum wheel and tire assembly with no void between a flexible center core and a wheel rim after a vacuum is applied.

FIG. 2a represents a cross section of the vacuum wheel assembly with vacuum channels and a vacuum valve assembly installation into a wheel rim and into a vacuum chamber.

FIG. 2b represents a side view of the vacuum wheel assembly with a concave surface and vacuum channels.

FIG. 2c represents a front view of the vacuum wheel assembly and vacuum valve assembly position on a wheel rim.

FIG. 3a represents a front view of the vacuum valve assembly.

FIG. 3b represents a side view of the vacuum valve assembly.

FIG. 3c represents a cross section of the vacuum valve assembly as well as the direction of air flow.

FIG. 4a represents an optional concave shaped tire tread configuration in a solid vacuum tire with no weight applied to the solid vacuum wheel and tire assembly.

FIG. 4b represents the tire tread position parallel to the ground surface with weight applied to the solid vacuum wheel and tire assembly.

DETAILED DESCRIPTION OF THE FIGURES

FIG. 1a represents a cross section of the solid vacuum wheel and tire assembly with a void 2 between a wheel rim 1 and a solid vacuum tire 24 flexible center core 3, before vacuum, which is present in the solid vacuum wheel and tire assembly before a vacuum is applied. The flexible center core 3 of the solid vacuum tire 24 will be able to contract and adhere directly into place onto a concave surface 22 of the wheel rim 1 after the vacuum is applied and will fill the void 2.

FIG. 1b represents a cross section of the solid vacuum wheel and tire assembly after a vacuum is applied. A solid vacuum tire 24 and a flexible center core 4, after vacuum, contracts and adheres directly onto a concave surface 22 of a wheel rim 1 for operation after filling the void 2, herein FIG. 1a. The wheel rim 1 contains vacuum channels 5 which are distributed along the wheel rim 1 and branch out to the concave surface 22 in order to direct and apply an even vacuum seal 25 between the flexible center core 4 and the concave surface 22 of the wheel rim 1.

FIG. 2a represents a cross section of the vacuum wheel assembly 23 which contains vacuum channels 5 and a vacuum valve assembly 6 installed into a wheel rim 1. The vacuum channels 5 are located in the vacuum wheel assembly 23 along a concave surface 22 in order to direct a vacuum seal 25, herein FIG. 1b. The vacuum valve assembly 6 is threaded into the wheel rim 1 and installed into a vacuum chamber 7, which acts as a conduit to direct a vacuum throughout the vacuum wheel assembly 23. The vacuum chamber 7 is directly connected to the vacuum channels 5 in order to allow for airflow and an even vacuum seal 25, herein FIG. 1b.

FIG. 2b represents a side view of the vacuum wheel assembly 23 and shows a concave surface 22 shape and vacuum channels 5 that are distributed along the concave surface 22 to achieve an even vacuum seal 25, herein FIG. 1b.

FIG. 2c represents a front view of the vacuum wheel assembly 23 and the vacuum valve assembly 6 installed into the wheel rim 1.

FIG. 3a represents a front view of a vacuum valve assembly 12, position of a valve stem tip 8 and a vacuum valve body 10. The valve stem tip 8 has an optional slot for a common cross head screwdriver.

FIG. 3b represents a side view of a vacuum valve assembly 12 with threads, the position of a ring seal 9 on a vacuum valve body 10 and a valve stem tip 8 with threads. The vacuum valve assembly 12 and ring seal 9 are threaded into the wheel rim 1, herein FIG. 2a. The valve stem tip 8 has optional threads for a common threaded valve stem adaptor. The vacuum valve body 10 also has threads for a common air chuck adaptor.

FIG. 3c represents a cross section of a vacuum valve assembly 12 as well as a direction of airflow 14 and 15 through the assembly. A valve stem 13 and a vacuum rubber stopper 11 are in direct contact with a vacuum valve body 10 when a vacuum is present in the vacuum valve assembly 12 during operation. The valve stem 13 has threads that are threaded into the vacuum valve body 10. Airflow can also flow through the valve body 10 when the vacuum rubber stopper 11 and valve stem 13 are removed. The valve stem 13 also has grooves to allow for airflow. The vacuum from the direction of airflow 15 also keeps the vacuum rubber stopper 11 in place during operation. To release the vacuum, the valve stem 13 and vacuum rubber stopper 11 are removed from the vacuum valve body 10 to let airflow 14 and 15 through vacuum valve body 10. The vacuum valve body 10 is threaded into a wheel rim 1, herein FIG. 2a, and into a vacuum chamber 7, herein FIG. 2a.

FIG. 4a represents a cross section of the solid vacuum wheel and tire assembly wheel rim 1 and a solid vacuum tire 24. The entire solid vacuum tire 24 can be built with an optional concave configuration 16. The solid vacuum tire 24 is comprised of resilient tire tread rubber 19, and a steel belt 20 is added to increase tire strength. A tire flexible center core 21 is comprised of flexible material that has the strength and resiliency to adhere the flexible center core 21 directly to the wheel rim 1 and also compress the flexible center core 21 directly to the concave surface 22 while keeping a constant vacuum seal. The flexible center core 21 is comprised of solid or porous rubber, jell or a combination of each and will provide a continuously ridged solid non-pneumatic core structure. The solid vacuum tire 24 contains no air pressure to go flat or release due to a puncture.

FIG. 4b represents a cross section of the solid vacuum wheel and tire assembly wheel rim 1 as the resilient tire tread rubber 17 rests flat and parallel the ground surface 18 with weight applied to the solid vacuum wheel and tire assembly. The entire solid vacuum tire 24 can be optionally configured to be parallel to the ground surface with no weight applied to the assembly.

What is claimed is:

1. A solid vacuum wheel and tire assembly, comprising of a vacuum wheel assembly and a solid vacuum tire, wherein the solid vacuum tire is comprised of a flexible center core comprising of solid or porous rubber, or jell surrounded by a steel belt and further surrounded by a resilient tire tread rubber, wherein the solid vacuum tire is installed onto the vacuum wheel assembly, wherein the flexible center core of the solid vacuum tire will contract and adhere directly into place onto a wheel rim while a vacuum is applied, wherein the flexible center core contracts and adheres directly against the wheel rim and remains in place during operation after the vacuum is applied, wherein the solid vacuum tire contains no air pressure to go flat or release, wherein vacuum channels are located within the wheel rim along a concave surface in order to direct a vacuum seal, wherein the vacuum seal is created by the vacuum contracting the flexible center core into a void that is present before the vacuum is applied between the flexible center core and the concave surface, wherein the vacuum channels are distributed along the concave surface of the wheel rim to achieve the vacuum seal between the solid vacuum tire and the concave surface in order to adhere the solid vacuum tire in place and directly in contact with the vacuum wheel assembly during operation.

2. A solid vacuum wheel and tire assembly as in claim 1, further comprising of a vacuum valve assembly which is installed into a vacuum chamber, wherein the vacuum chamber is located inside the wheel rim, wherein the vacuum chamber is a conduit to direct a vacuum throughout the solid vacuum wheel and tire assembly, wherein the vacuum valve assembly is comprised of a valve stem and a vacuum valve body and a ring seal, wherein the valve stem is comprised of a valve stem tip and a vacuum rubber stopper which are removed from the vacuum valve body in order to apply the vacuum or to release the vacuum, wherein air can flow into and out through the valve body, wherein the valve stem is threaded into the vacuum valve body, wherein airflow into and out through the valve body is eliminated by the vacuum rubber stopper during operation, wherein the release of the vacuum is achieved by removing the valve stem from the vacuum valve body in order to let air through the vacuum valve assembly, wherein the valve body and the ring seal are threaded in the vacuum chamber of the wheel rim, wherein the solid vacuum tire is installed onto the vacuum wheel assembly before the vacuum is applied through the vacuum valve assembly, wherein releasing the vacuum between the vacuum wheel assembly and the solid vacuum tire through the vacuum valve assembly will allow the solid vacuum tire to be removed from the vacuum wheel assembly.

3. A solid vacuum wheel and tire assembly as in claim 1, further comprising of the solid vacuum tire, wherein an entire solid vacuum tire configuration is concave or parallel to a ground surface with no weight applied to the solid vacuum wheel and tire assembly, wherein the resilient tire tread rubber rests parallel on the ground surface with weight applied to the solid vacuum wheel and tire assembly, wherein the steel belt is installed into the flexible center core for additional strength, wherein the flexible center core is comprised of solid or porous rubber, or jell that has the strength and resiliency to adhere the flexible center core to the wheel rim and also compress the flexible center core to the wheel rim while retaining the vacuum seal, wherein the flexible center core will adhere the solid vacuum tire in place onto the concave surface during operation while the vacuum seal is applied, wherein the solid vacuum tire is continuously ridged and non-pneumatic during operation.

* * * * *